US010834022B2

(12) United States Patent
Paul et al.

(10) Patent No.: US 10,834,022 B2
(45) Date of Patent: Nov. 10, 2020

(54) RESOURCE CONFIGURATION USING TOPOLOGY DIAGRAM

(71) Applicant: International Business Machines Corporation, Armonk, NY (US)

(72) Inventors: Bepsy Paul, San Jose, CA (US); Vaishali Pandya, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/128,045

(22) Filed: Sep. 11, 2018

(65) Prior Publication Data
US 2020/0084161 A1    Mar. 12, 2020

(51) Int. Cl.
G06F 15/173    (2006.01)
H04L 12/911    (2013.01)
H04L 12/24    (2006.01)

(52) U.S. Cl.
CPC ........ H04L 47/829 (2013.01); H04L 41/0893 (2013.01); H04L 41/0896 (2013.01); H04L 41/12 (2013.01); H04L 47/822 (2013.01); H04L 41/22 (2013.01)

(58) Field of Classification Search
CPC ............... H04L 47/829; H04L 41/0893; H04L 41/0896; H04L 41/12; H04L 47/822; H04L 41/22
USPC ......................................................... 709/226
See application file for complete search history.

(56) References Cited

U.S. PATENT DOCUMENTS

| 5,772,204 | A | 6/1998 | Phelps | |
|---|---|---|---|---|
| 6,957,263 | B2 * | 10/2005 | Galou | H04L 41/0806 709/219 |
| 7,315,985 | B1 * | 1/2008 | Gauvin | H04L 41/12 715/734 |
| 7,856,599 | B2 | 12/2010 | Proulx et al. | |
| 8,074,218 | B2 * | 12/2011 | Eilam | G06F 9/5077 718/1 |
| 8,819,271 | B2 | 8/2014 | Hilving et al. | |
| 8,850,322 | B2 | 9/2014 | Subramanian et al. | |

(Continued)

OTHER PUBLICATIONS

Goodell, G., et al., "Working around BGP: An Incremental Approach to Improving Security and Accuracy in Interdomain Routing", Proceedings of the Network and Distributed System Security Symposium, NDSS 2003, Jan. 2003, 11 pages.

(Continued)

*Primary Examiner* — Atta Khan
(74) *Attorney, Agent, or Firm* — Scully, Scott, Murphy & Presser, P.C.; Michael O'Keefe (57) ABSTRACT

Methods and systems of configuring resources are described. A processor may receive a request to employ a set of resources to perform a task. The processor may display a topology diagram that includes image objects representing the requested resources and input objects associated with configurable resources. The processor may receive parameter values entered via the input objects of the topology diagram displayed on the user interface. The processor may validate that the set of parameter values is acceptable. The processor may, in response to the validating, configure the at least one configurable resource with the set of parameter values. The processor may output a notification indicating that the requested set of resources configured with the set of parameter values is capable of performing the task.

20 Claims, 7 Drawing Sheets

(56) References Cited

U.S. PATENT DOCUMENTS

| | | | |
|---|---|---|---|
| 9,292,279 B2 | 3/2016 | Yang et al. | |
| 9,331,910 B2 | 5/2016 | Dutt et al. | |
| 9,742,661 B2 | 8/2017 | Klais | |
| 9,853,938 B2 | 12/2017 | Shih | |
| 2009/0172769 A1* | 7/2009 | Bobak | H04L 69/40 |
| | | | 726/1 |
| 2009/0183021 A1* | 7/2009 | Arnold | G06F 11/3608 |
| | | | 714/2 |
| 2013/0305091 A1* | 11/2013 | Stan | H04L 43/50 |
| | | | 714/35 |
| 2016/0234073 A1 | 8/2016 | Maes | |
| 2016/0364320 A1* | 12/2016 | Trivedi | G06F 11/3664 |

OTHER PUBLICATIONS

Nguyen, H., et al, "How to Build Complex, Large-Scale Emulated Networks", International Conference on Testbeds and Research Infrastructures, TridentCom 2010, May 18-20, 2010, pp. 3-18, LNICST, vol. 46.

* cited by examiner

RESOURCE CONFIGURATION USING TOPOLOGY DIAGRAM

FIELD

The present application relates generally to computers, and computer applications, and more particularly to computer-implemented methods and systems relating to network resource configurations.

BACKGROUND

A cloud computing environment may offer a pool of configurable resources that may be employed by users to perform computing tasks. The users may need to define parameters to configure the resources in order to model a system that may perform the computing tasks. In some examples, the users may be unfamiliar with the resources they are configuring, and thus, may define erroneous parameters, resulting in employment of wrong resources, unnecessary expenses, and reduced efficiency in connectivity and communications among the employed resources.

SUMMARY

In some examples, a method of configuring a set of resources is generally described. The method may include receiving, by a processor, a request to employ a set of resources to perform a task. The requested set of resources may comprise at least one configurable resource. The method may further include displaying, by the processor, a topology diagram on a user interface. The topology diagram may comprise a set of image objects representing the requested set of resources. The topology diagram may further comprise a set of input objects associated with a subset of the image objects. The subset of image objects may represent the at least one configurable resource. The method may further include receiving, by the processor, a set of parameter values entered via the set of input objects of the topology diagram displayed on the user interface. The method may further include validating, by the processor, that the set of parameter values is acceptable. The method may further include in response to the validating, configuring, by the processor, the at least one configurable resource with the set of parameter values. The method may further include outputting, by the processor, a notification indicating that the requested set of resources configured with the set of parameter values is capable of performing the task.

In some examples, a system of configuring a set of resources is generally described. The system may comprise a memory and a processor configured to be in communication with each other. The memory may be configured to store a set of instructions. The processor may be configured to execute the set of instructions. The processor may be configured to receive a request to employ a set of resources to perform a task. The requested set of resources may comprise at least one configurable resource. The processor may be further configured to display a topology diagram on a user interface. The topology diagram may comprise a set of image objects representing the requested set of resources. The topology diagram may further comprise a set of input objects associated with a subset of the image objects. The subset of image objects may represent the at least one configurable resource. The processor may be further configured to receive a set of parameter values entered via the set of input objects of the topology diagram displayed on the user interface. The processor may be further configured to validate that the set of parameter values is acceptable. The processor may be further configured to, in response to the validating, configure the at least one configurable resource with the set of parameter values. The processor may be further configured to output a notification indicating that the requested set of resources configured with the set of parameter values is capable of performing the task.

In some examples, a computer program product of configuring a set of resources is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

A system in accordance with the present disclosure (e.g., system 100 shown in FIG. 1) may present a network topology diagram with required input fields to the users, instead of presenting a form and prompting the users to enter desired parameter values. The presentation of the network topology diagram provides clarity on the resources that are being configured by the users who wish to employ the resources. By providing the network topology diagram as a configuration tool, the system 100 may reduce configuration errors and may improve an efficiency of the connections and communications among the employed resources. The network topology diagram presented to the users may include visual designations, such as input objects, for users to define parameter values to configure the resources. Thus, the system 100 may provide the users with a visual experience on the network topology, such as visualizing how the defined parameters may affect the efficiency of the connectivity and communication among the resources.

Figure 1:
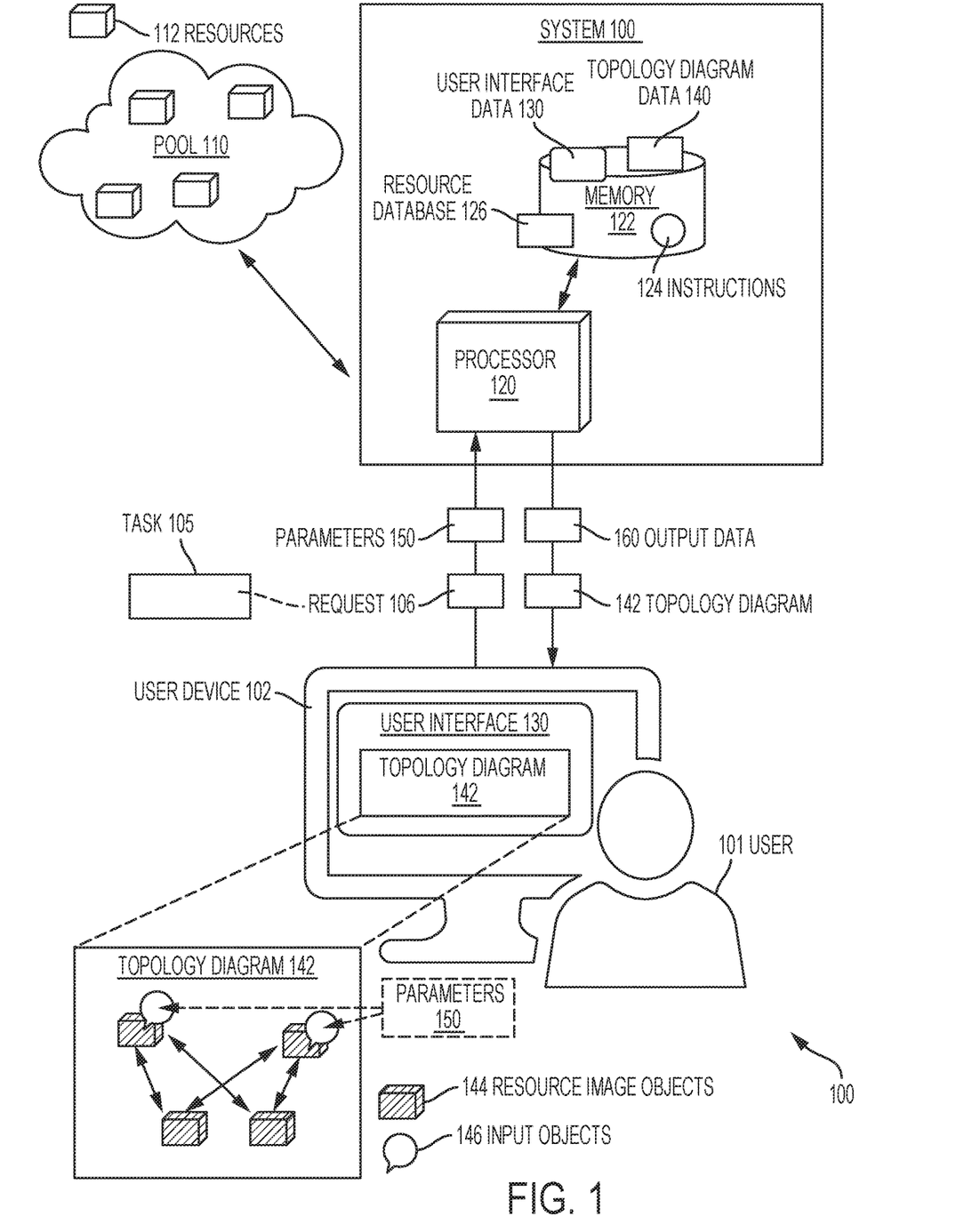
FIG. 1 illustrates an example computer system in one embodiment that can be utilized to implement resource configuration using topology diagram in one embodiment.

FIG. 1 illustrates an example computer system 100 that can be utilized to implement resource configuration using topology diagram, arranged in accordance with at least some embodiments described herein. In some examples, the system 100 may be a system implemented on a computer device. The system 100 may include a processor 120 and a memory 122 configured to be in communication with each other. The processor 120 may be a central processing unit of a computer device. In some examples, the processor 120 may be configured to control operations of the memory 122 and/or other components of the system 100. In some examples, the system 100 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure.

The memory 122 may be configured to selectively store instructions executable by the processor 120. For example, in one embodiment, the memory 122 may store a set of instructions 124, where the instructions 124 may include instructions, such as executable code, related to graph theory, graphics processing, network connectivity and communications, and/or other algorithms or techniques, which may implement the system 100. The processor 120 may be configured to execute one or more portions of the instructions 124 in order to facilitate implementation of the system 100. In some examples, the instructions 124 may be packaged as a standalone application that may be installed on the computer device implementing the system 100, such that the instructions 124 may be executed by the processor 120 to implement the system 100. In some examples, the instructions 124 may be stored in a programmable hardware component that may be embedded as part of the processor 120.

In some examples, the processor 120 and/or the memory 122 may be configured to be in communication with a pool 110, where the pool 110 may be a collection of resources 112. The resources 112 may include hardware components and software components, and may include at least one configurable resource. A configurable resource may be a component that may be assigned to operate with one or more user-defined parameter values, and each parameter value may affect the operation of the configurable resource. Examples of configurable resource may include processors, memory, routers, switches, networks, data centers, and/or other resources. In some examples, the pool 110 may be a cloud computing environment, such as a private cloud, a community cloud, a public cloud, or a hybrid cloud.

In some examples, the system 100 may be a system configured to process service requests to employ resources 112 among the pool 110, such as processing service orders of resources 112 among the pool 110, where the ordered resources may be used by a user to perform a computing task. In an example shown in FIG. 1, a user 101 may use a user device 102 to send a request 106 to the system 100, where the request 106 may be a request to employ one or more resources 112 from the pool 110 to perform a task 105. For example, the user 101 may be associated with a company that has large amounts of information. In order to reduce cost in purchasing and/or maintaining devices and equipment to perform computing tasks on the information, the user 101 may desire to employ resources 112 among the pool 110 to perform computing tasks on the information. Some examples of the task 105 may include computer related task such as dataset processing, data storage, application deployment, content hosting, and/or other computing task.

The processor 120 may receive the request 106 and, in response, may identify the requested resources in a resource database 126 stored in the memory 122. The resource database 126 may include data indicating a list of resources 112 among the pool 110. The resource database 126 may further include associations of each resource 112 to one or more service packages that may be offered by the system 100. For example, the system 100 may offer combinations of resources, with pre-defined parameters, to be employed by the users of the system 100, such as combinations including particular processor speed, memory capacity, operating system, network speed, and/or other configurations. In some examples, the request 106 may indicate a particular service package, and the processor 120 may use the resource database 126 to identify a set of resources 112 associated with the requested service package.

Upon identifying the requested resources in the resource database 126, the processor 120 may identify topology diagram data 140 associated with the requested resources. The topology diagram data 140 may be processed or rendered by the processor 120 to produce a topology diagram 142. The topology diagram 142 may be an image that depicts an arrangement of resources 112 as a physical topology or a logical topology. The resources 112 may be modeled as nodes and the connections among the resources 112 may be modeled as links or lines between the nodes. In some examples, the topology diagram 142 may include a physical topology and/or a logical topology. A physical topology may refer to a physical arrangement of the various elements, such as device locations and cable installations. A logical topology may refer to data flow within a network of elements. In some examples, the topology diagram 142 may further depict connectivity among resources, such as connection elements including cables, or indications of wireless connections.

The topology diagram data 140 may include static image data that may be processed by the processor 120 to produce resource image objects 144 on the topology diagram 142, where the resource image objects 144 may be static images that cannot be modified. For example, a resource image object 144 may be an image of a server, where the user 101 may not modify image properties of the image of the server displayed on the topology diagram 142. The topology diagram data 140 may further include input object data that may be processed by the processor 120 to produce input objects 146 on the topology diagram 142, where the input objects 146 may be editable fields such as text boxes, dropdown menus, selectable inputs, buttons, and/or other image objects that may receive inputs. Each input object data among the topology diagram data 140 may be associated with a piece of static image data that represents a configurable resource among resources 112. In an example, when topology diagram 142 is produced by the processor 120, at least a portion of each configurable resource represented by a resource image object 144 may be attached with, or overlaid by, an associated input object 146. The resource image object 144 representing resources that may be unconfigurable may not be attached with, or overlaid by, any input object 146.

The processor 120 may produce and display the topology diagram 142 on a user interface 130. The user interface 130 may be used by the user 101 to generate the request 106, view the topology diagram 142, navigate various options related to the services and resources that may be provided by the pool 110, and/or other operations related to the system 100 and the pool 110. Upon display of the topology diagram 142 on the user interface 130, the user 101 may use the topology diagram 142 to define parameters 150 for each configurable resources that may be depicted as resource image objects 144 (further described below). For example, if an input object 146, such as a bubble including two parameters, is attached to a particular resource image object 144, the user 101 may define the parameter 150 by selecting one of the two parameters in the bubble. Upon defining parameters 150 for all configurable resources depicted on the topology diagram 142, the user 101 may use the user device 102 to send the defined parameters 150 to the system 100. In some examples, the processor 120 may reject the transmission of the parameters 150 to the system 100 if not all required parameters are entered by the user 101. For example, among the topology diagram 142, configurable resources A, B, C are required to have user defined parameters. If the user device 102 attempts to transmit parameters for configurable devices A and B only, but not for configurable resource C, the processor 120 may return an error message to the user device 102 to request the user 101 to define a parameter for configurable resource C.

Upon receiving parameters 150, the processor 120 may validate whether the parameters 150 are acceptable, such as whether the resources configured with the parameters 150 are capable of performing the task 105 requested by the user 101. If the parameters 150 are acceptable, the processor 120 may configure the requested set of resources indicated by the request 106 with the parameters 150. Upon the configuration, the processor 120 may send output data 160 to the user device 102, where the output data 160 may include a notification indicating that the resources configured with the parameters 150 are capable of performing the task 105. The user 101 may use the user interface 130 and the system 100 to complete the service order employing the resources 112 with parameters 150 to perform the task 105.

In examples where the processor 120 determines that the parameters 150 are not acceptable, the processor 120 may send output data 160 to the user device 102, where the output data 160 may include a notification indicating that new parameters may need to be defined. The user 101 may select the input objects 146 depicted in the topology diagram 142 to redefine the parameters 150 until the processor 120 validates parameters that are acceptable.

Figure 2:
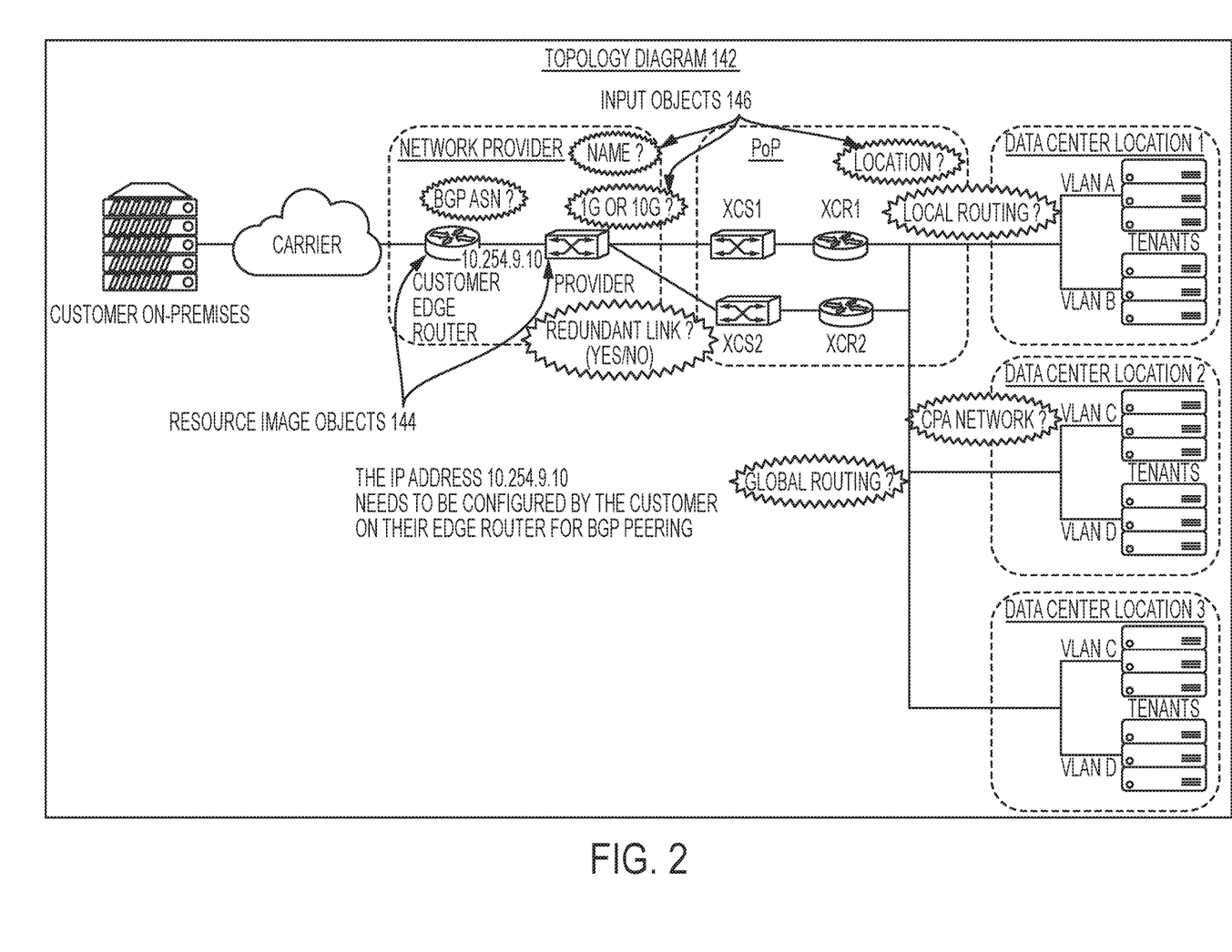
FIG. 2 illustrates an example implementation of resource configuration using topology diagram in one embodiment.

FIG. 2 illustrates an example implementation of resource configuration using topology diagram, arranged in accordance with at least some embodiments described herein. FIG. 2 may be described below with references to the above descriptions of FIG. 1.

In an example, the task 105 may be to setup a private connection that may be provisioned and managed by a host of the pool 110 (e.g., a company that owns and manages the pool 110). The private connection may be a connection dedicated to be used by the user 101, such that resources that are employed to establish and run the private connection may be accessible by the user 101 and/or the host of the pool 110, and inaccessible by other entities. The processor 120 may send output data 160 to the user device 102, where the output data 160 may include an Internet Protocol (IP) address that may be used by the user 101 as an entry point to the private connection. The IP address may be internal to the host of the pool 110 and devices outside of the host may be unable to access the IP address.

In the example shown in FIG. 2, upon receiving the request 106 indicating the task 105 to setup the private connection, the processor 120 may refer to the resource database 126 to identify resources that may fulfill the task 105, such as the types of resources that may be utilized to setup the private connection. The identified resources may include configurable resources (e.g., resources that can be configured with user-defined parameters) and unconfigurable resources (e.g., resources that cannot be configured with user-defined parameters). For example, the host of the pool 110 may have control on which resources may be configurable or unconfigurable. If the host indicates that switches and routers at particular points of presence (PoPs) are unconfigurable, the resource database 126 may flag the switches and routers at the particular PoPs as unconfigurable. In the example shown in FIG. 2, the identified resources may include components such as one or more network providers, data centers at different geographical locations, and switches (XCS) and routers (XCR) at different PoPs. In some examples, the resource database 126 may indicate whether a type of resource is configurable or unconfigurable.

In some examples, the request 106 may indicate a requirement of a particular type of resources, such as three data centers at particular geographical locations. As such, the processor 120 may identify the three data centers indicated in the request 106.

Upon identifying the resources needed to fulfill the task 105, the processor 120 may identify a topology diagram 142 from the memory 122. In some examples, the memory 122 may store more than one topology diagram, where each stored topology diagram may include a respective set of resources. Each topology diagram stored in the memory 122 may correspond to a service package that may be offered by the host of the pool 110, where each service package may correspond to a particular task, arrangement of resources, set of parameters of resources, price, and/or other attributes. In an example, if the request 106 indicates a service package including network provider X, PoP at location Y, and data center at location Z, the processor 120 may identify a topology diagram that includes network provider X, PoP at location Y, and data center at location Z. The processor 120 may identify the topology diagram 142 that corresponds to the task 105, such as in the example, the identified topology diagram 142 includes components that may facilitate setup of a private connection, such as a network provider, point of presence (PoP), and one or more datacenters at different locations.

Further, upon identifying the resources needed to fulfill the task 105, the processor 120 may identify the configurable resources among the identified resources. The processor 120 may identify the configurable resources using the resource database 126. In response to identifying the configurable resources, the processor 120 may refer to the resource database 126 to identify input objects 146 associated with the configurable resources. For example, if a configurable resource is a network provider, the resource database 126 may include mappings of a network provider resource to one or more network speeds. The processor 120 may identify an input object indicating choices of network speeds, and may attach the identified input object to the configurable resource of network provider. In the example shown in FIG. 2, as a result of attaching the identified input object to a network provider resource, the topology diagram 142 may include a resource image object 144 representing a network provider with a bubble (input object 146) indicating choices of speeds "1G or 10G?". Upon attaching input objects 146 to all configurable resources among the resources identified for the task 105, the processor 120 may display the topology diagram 142 including the resource image objects 144 of configurable resources with associated input objects 146, and unconfigurable resources, on the user interface 130.

The user 101 may view the topology diagram 142 displayed on the user interface 130 and may use the displayed input objects 146 to define the parameters 150. For example, the user 101 may select the input object 146 indicating "1G or 10G?" to define a network speed of "1G" or "10G" of the network provider. In the example shown in FIG. 2, the user

101 may also use the input objects 146 to assign a name to the private connection ("Name?"), choosing whether to use a redundant link ("Redundant Link? (YES/NO)"), choosing locations of the PoPs ("Location?"), and/or define parameters for other configurable resources.

In some examples, the user 101 may also specify a number of resources desired to perform the task 105, such as a number of data centers. In the example shown in FIG. 2, the topology diagram 142 includes three data centers. The user 101 may indicate a desire to add or remove data centers, such that the processor 120 may update the topology diagram 142 with the desired number of data centers. The update of the topology diagram 142 may be performed by the processor 120 prior to all parameters 150 being defined by the user 101.

Upon receiving parameters 150 defined by the user 101 using the input objects 146, the processor 120 may validate whether the parameters 150 are acceptable. Upon validating that the parameters 150 are acceptable (e.g., that the resources configured with the parameters 150 are capable of running the private connection as requested), the processor 120 may automatically configure the configurable resources based on the parameters 150. Upon the configuration, the processor 120 may send the output data 160 to the user device 102, where the output data 160 may include a notification indicating that the resources configured with the parameters 150 may run the desired private connection, and may include an IP address that may be used by the user 101 as an entry point to the private connection setup by the system 100.

If the processor 120 determines that the resources configured with the parameters 150 are not capable of running the private connection, the processor 120 may send the output data 160 to the user device 102 to display an error message indicating that new parameters may need to be defined. The processor 120 may flag the configurable resources in the topology diagram 142 that needs parameters redefined, such as by highlighting or visually emphasizing the configurable resource that needs to be flagged, or by displaying the previous input objects 146 associated with the resources that need parameters redefined.

Figure 3:
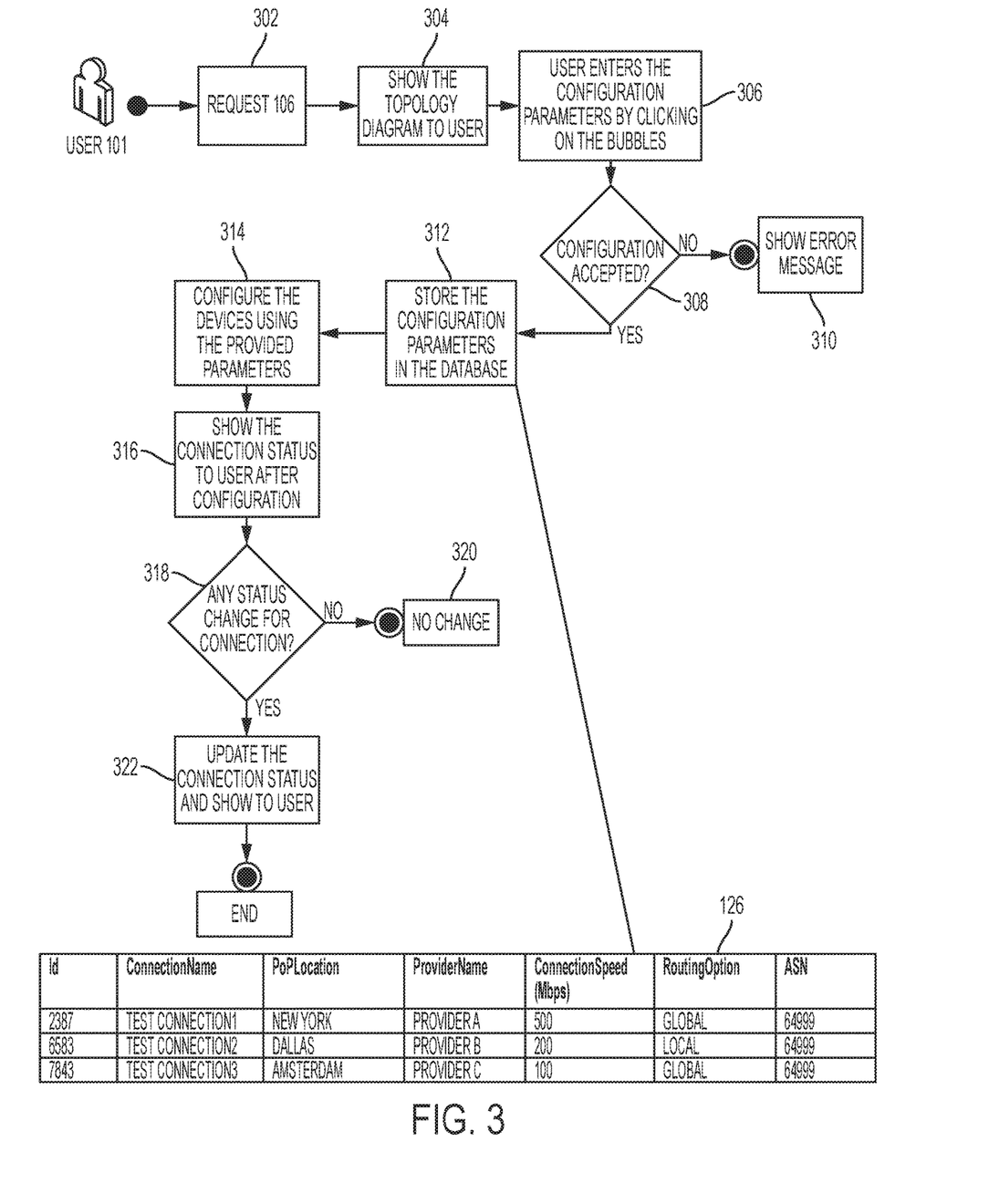
FIG. 3 illustrates a flow diagram relating to resource configuration using topology diagram in one embodiment.

FIG. 3 illustrates a flow diagram relating to resource configuration using topology diagram, arranged in accordance with at least some embodiments presented herein. The process in FIG. 3 may be implemented using, for example, computer system 100 discussed above. An example process may include one or more operations, actions, or functions as illustrated by one or more of blocks 302, 304, 306, 308, 310, 312, 314, 316, 318, 320, and/or 322. Although illustrated as discrete blocks, various blocks may be divided into additional blocks, combined into fewer blocks, eliminated, or performed in parallel, depending on the desired implementation.

Processing may begin at block 302, where the user 101 may send a request 106 to the system 100.

Processing may continue from block 302 to block 304. At block 304, the processor 120 may display the topology diagram 142 to the user 101.

Processing may continue from block 304 to block 306. At block 306, the user 101 may enter the parameters 150 by using the input objects 146 displayed on the topology diagram 142.

Processing may continue from block 306 to block 308. At block 308, the processor 120 may determine whether to accept the parameters 150. For example, the processor 120 may determine that the user 101 has yet to complete defining parameters of all configurable resources shown by the topology diagram 142 and may not accept the parameters 150. In another example, the processor 120 may determine that the parameters 150 input by the user 101 may be of a wrong format, such as when the user 101 entered text instead of numbers for particular parameters, or when the user 101 entered a number that is out of a range of a particular parameter, or when the user 101 designate a data center location that is out of range, and/or other situations.

If the processor 120 does not accept the parameters 150, the processing may continue from block 308 to block 310. At block 310, the processor 120 may show an error message to the user 101 in order to prompt the user 101 to redefine the parameters 150.

If the processor 120 accepts the parameters 150, the processing may continue from block 308 to block 312. At block 312, the processor 120 may store the parameters 150 in the resource database 126. For example, the user 101 may define parameters such as a connection name, a PoP location, a network provider, a connection speed, routing options, and/or other parameters. The processor 120 may populate the resource database 126 with parameters 150 that are accepted.

Processing may continue from block 312 to block 314. At block 314, the processor 120 may automatically configure the resources using the accepted parameters.

Processing may continue from block 314 to block 316. At block 316, the processor 120 may display a connection status to the user 101, such as displaying indications of connectivity among the configured resources with the parameters 150. The processor 120 may use visual indicators to display the connectivity, for example using colors to represent a health and/or speed of a connection, or other effects such as blinking an edge connecting two nodes to indicate unstable connection, and/or other indications.

Processing may continue from block 316 to block 318. At block 318, the processor 120 may inquire the user 101 if any changes are needed to the currently displayed resources.

If the user 101 indicates that no changes are needed, the processing may continue from block 318 to block 320, where the request 106 is fulfilled.

If the user 101 indicates that changes are needed, the processing may continue from block 318 to block 322, where the processor 120 may receive new parameters from the user 101 and continue to update the topology diagram 142 displayed to the user 101 based on the new parameters. The new parameters may be stored by the processor 120 in the resource database 126 upon the update.

In some examples, the request 106 at block 302 may be a request to reconfigure an existing system including a set of resources configured with parameters previously defined by the user 101. The system 100 may execute one or more of blocks 302, 304, 306, 308, 310, 312, 314, 316, 318, 320, and/or 322 to update the configured resources based on the redefined parameters entered by the user 101.

Figure 4:
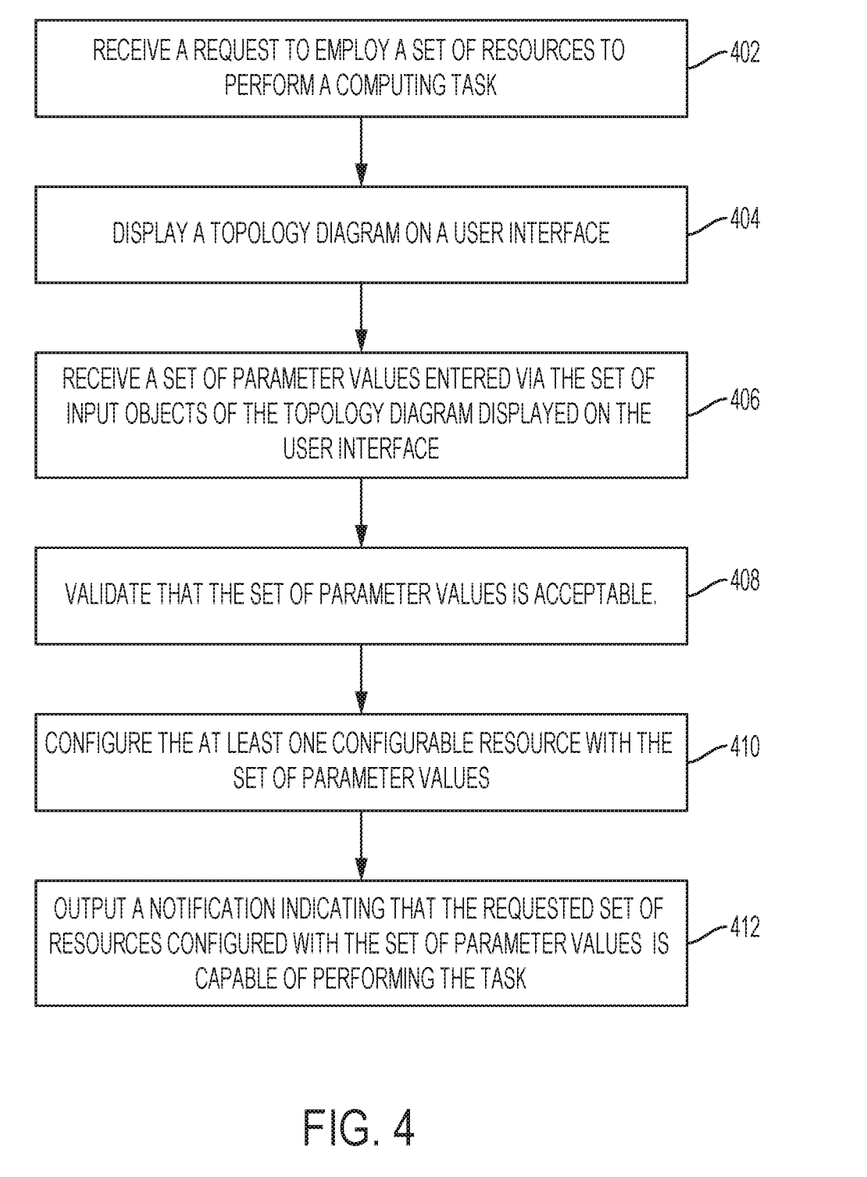
FIG. 4 illustrates a flow diagram relating to resource configuration using topology diagram in one embodiment.

FIG. 4 illustrates a flow diagram relating to resource configuration using topology diagram, arranged in accordance with at least some embodiments presented herein. The process in FIG. 4 may be implemented using, for example, computer system 100 discussed above. An example process may include one or more operations, actions, or functions as illustrated by one or more of blocks 402, 404, 406, 408, 410, and 412. Although illustrated as discrete blocks, various blocks may be divided into additional blocks, combined into fewer blocks, eliminated, or performed in parallel, depending on the desired implementation.

Processing may begin at block 402, where a processor may receive a request to employ a set of resources to perform a computing task. The requested set of resources may include at least one configurable resource. In some examples, the requested set of resources may include a set of unconfigurable resources.

Processing may continue from block 402 to block 404. At block 404, the processor may display a topology diagram on a user interface. The topology diagram may include a set of image objects representing the requested set of resources. The topology diagram may further include a set of input objects associated with a subset of the image objects. The subset of image objects may represent the at least one configurable resource. In some examples, the topology diagram may be identified by the processor among a plurality of topology diagrams, where the identification may be performed in response to the receipt of the request. In some examples, an input object may include an image indicating at least two parameters.

Processing may continue from blocks 404 to block 406. At block 406, the processor may receive a set of parameter values defined in the set of input objects of the topology diagram displayed on the user interface.

Processing may continue from blocks 406 to block 408. At block 408, the processor may validate that the set of parameter values is acceptable.

Processing may continue from blocks 408 to block 410. At block 410, in response to validating that the set of parameter values is acceptable, the processor may configure the at least one configurable resource with the set of parameter values.

Processing may continue from blocks 410 to block 412. At block 412, the processor may output a notification indicating that the requested set of resources configured with the set of parameter values is capable of performing the task.

Figure 5:
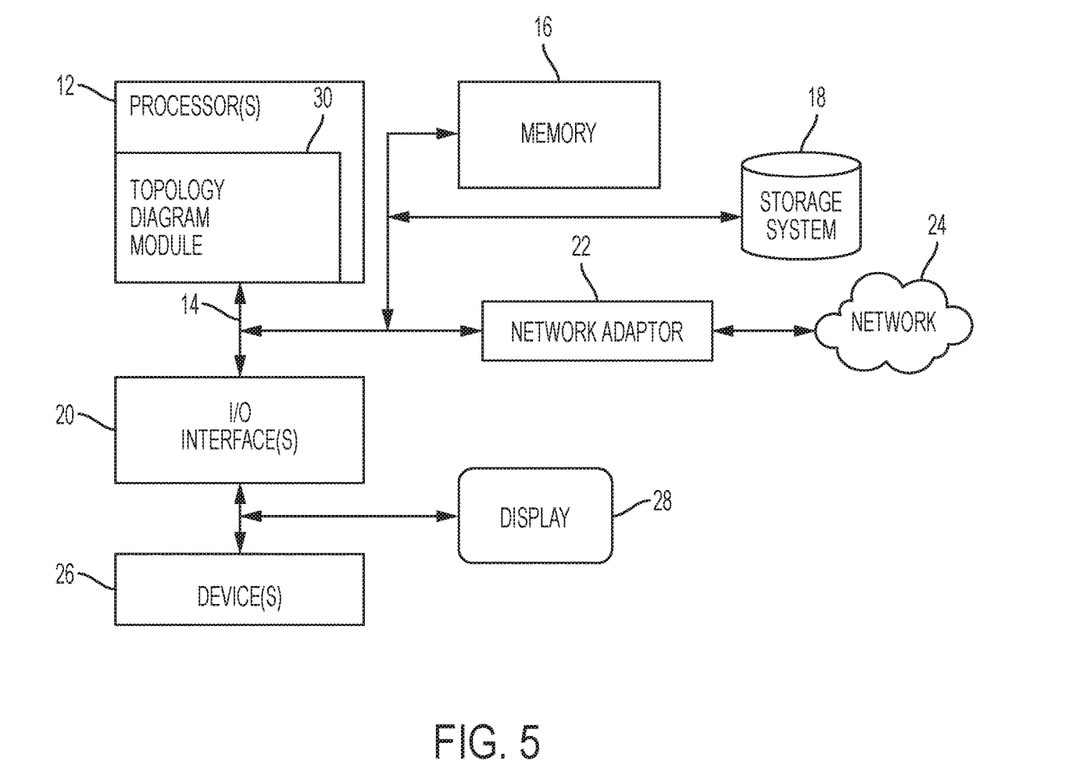
FIG. 5 illustrates a schematic of an example computer or processing system that may implement resource configuration using topology diagram in one embodiment.

FIG. 5 illustrates a schematic of an example computer or processing system that may implement resource configuration using topology diagram in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., topology diagram configuration module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 6:
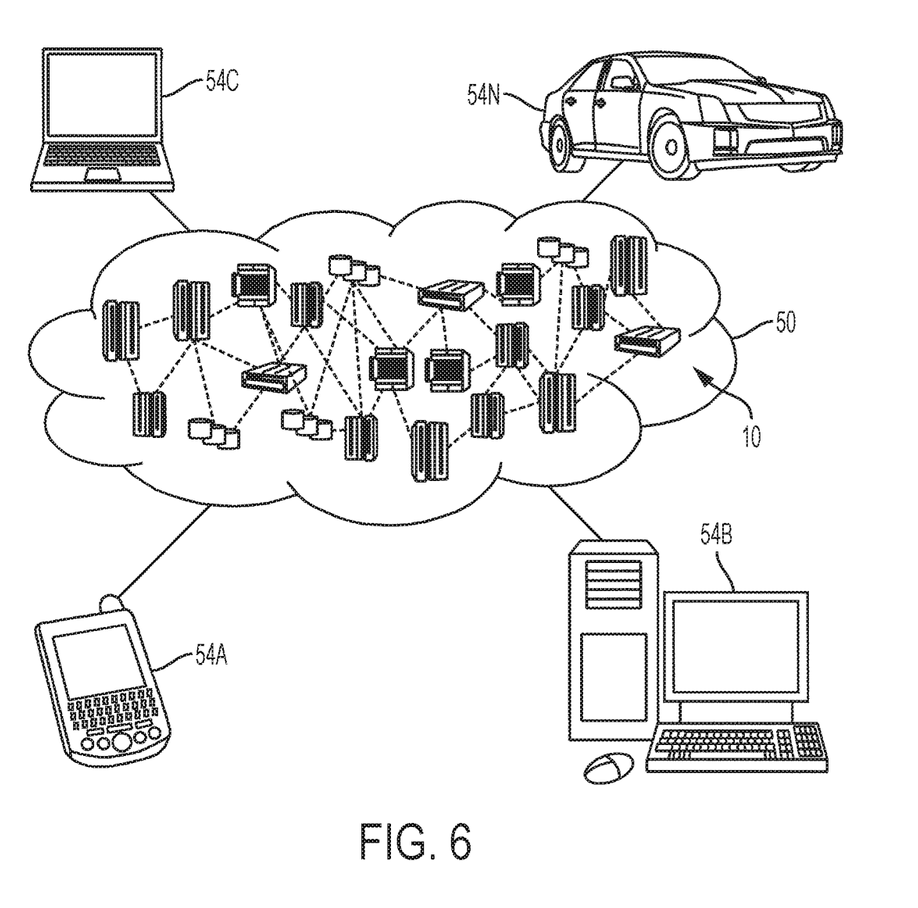
FIG. 6 depicts a cloud computing environment according to an embodiment of the present invention.

FIG. 6 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
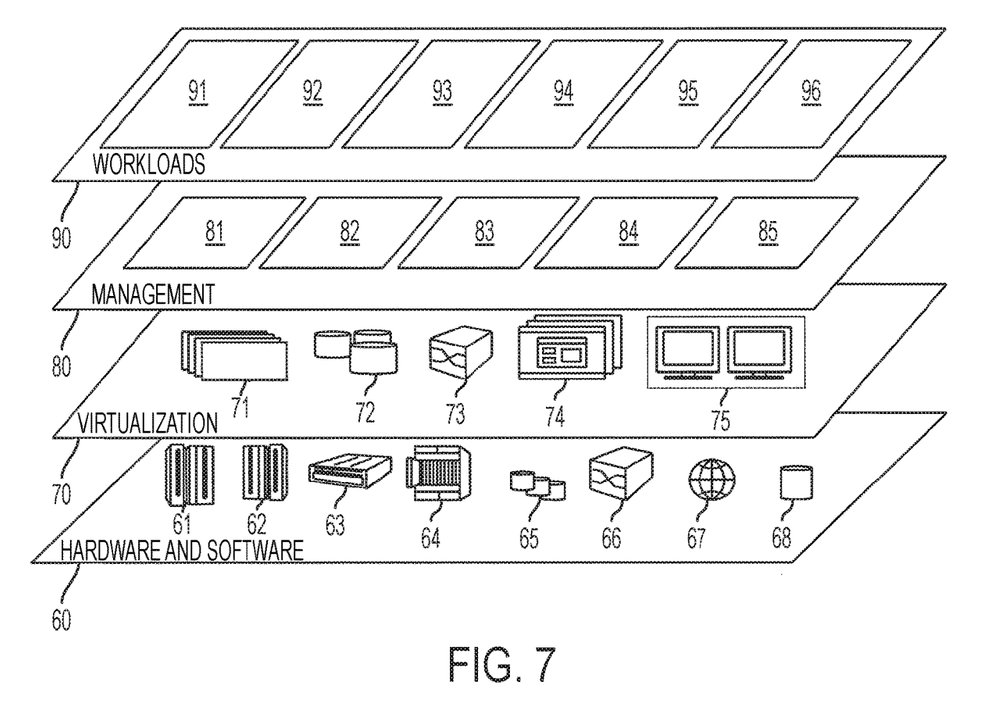
FIG. 7 depicts abstraction model layers according to an embodiment of the present invention.

FIG. 7 depicts abstraction model layers according to an embodiment of the present invention. Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and topology diagram configuration 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, by a processor, a request to perform a task;
   identifying, by the processor, a set of resources to perform the task, wherein the set of resources comprises at least one configurable resource;
   identifying, by the processor, at least one input object associated with the at least one configurable resource, wherein identifying the at least one input object includes referencing a resource database having mappings between a plurality of configurable resources and a plurality of input objects;
   attaching, by the processor, the at least one input object to the at least one configurable resource;
   displaying, by the processor, a topology diagram on a user interface, wherein the topology diagram comprises:
      a set of static image objects representing the identified set of resources;
      the at least one input object attached to at least one static image object representing the at least one configurable resources, the at least one static image object being among the set of static image objects;
   receiving, by the processor, a set of parameter values entered via the at least one input object attached to the at least one static image of the topology diagram displayed on the user interface;
   validating, by the processor, that the set of parameter values is acceptable, wherein the set of parameter values is acceptable when the set of parameter values are being used to configure the at least one configurable resource to cause the identified set of resources to perform the task successfully;
   in response to the validating, autonomously configuring, by the processor, the at least one configurable resource with the set of parameter values; and
   outputting, by the processor, a notification, on the user interface displaying the topology diagram, indicating that the identified set of resources having the at least one configurable resource configured with the set of parameter values is capable of performing the task.

2. The method of claim 1, wherein the validating is performed in response to receiving parameters for all configurable resources among the identified set of resources.

3. The method of claim 1, wherein the identified set of resources comprises a set of unconfigurable resources.

4. The method of claim 1, further comprising, in response to identifying the set of resources, identifying, by the processor, the topology diagram among a plurality of topology diagrams based on the request.

5. The method of claim 1, wherein in response to a validation result indicating that the set of parameter values is unacceptable, the method further comprising:
   displaying, by the processor, an error message indicating that the set of parameter values is unacceptable;
   receiving, by the processor, a new set of parameter values entered via the at least one input object of the topology diagram displayed on the user interface;
   validating, by the processor, that the new set of parameter values is acceptable;
   configuring, by the processor, the at least one configurable resource with the new set of parameter values; and
   outputting, by the processor, a notification indicating that the identified set of resources having the at least one configurable resource configured with the new set of parameter values is capable of performing the task.

6. The method of claim 1, wherein the at least one input object includes an image indicating at least two parameters.

7. The method of claim 1, further comprising outputting, by the processor, an Internet Protocol (IP) address that leads to access of the identified set of resources.

8. The method of claim 1, further comprising:
   receiving, by the processor, a request to reconfigure a particular resource;
   receiving, by the processor, a new parameter value entered via a particular input object of the topology diagram displayed on the user interface, wherein the particular input object corresponds to the particular resource;
   validating, by the processor, that the new parameter value is acceptable; and configuring, by the processor, the particular resource with the new parameter value.

9. A system comprising:
a memory configured to store a set of instructions; and
a processor configured to be in communication with the memory, wherein the processor is configured to execute the set of instructions to:
receive a request to employ a set of resources to perform a task, wherein the requested set of resources comprises at least one configurable resource;
identify at least one configurable resource among the set of requested resources;
identify at least one input object associated with the at least one configurable resource, wherein the identification of the at least one input object includes referencing a resource database having mappings between a plurality of configurable resources and a plurality of input objects;
attach the at least one input object to the at least one configurable resource;
display a topology diagram on a user interface, wherein the topology diagram comprises:
a set of static image objects representing the requested set of resources;
a set of input objects associated with a subset of the image objects, wherein the subset of image objects represents the at least one configurable resource attached with the at least one input object;
receive a set of parameter values entered via the set of input objects of the topology diagram displayed on the user interface;
validate that the set of parameter values is acceptable, wherein the set of parameter values is acceptable when the set of parameter values are being used to configure the at least one configurable resource to cause the identified set of resources to perform the task successfully;
in response to the validation, autonomously configure the at least one configurable resource with the set of parameter values; and
output a notification, on the user interface displaying the topology diagram, indicating that the requested set of resources having the at least one configurable resource configured with the set of parameter values is capable of performing the task.

10. The system of claim 9, wherein the processor is further configure to validate the set of parameter values in response to receiving parameters for all configurable resources among the requested set of resources.

11. The system of claim 9, wherein the requested set of resources comprises a set of unconfigurable resources.

12. The system of claim 9, further comprising, wherein the processor is further configured to, in response to the receipt of the request, identify the topology diagram among a plurality of topology diagrams based on the request, and wherein the plurality of topology diagrams are stored in the memory.

13. The system of claim 9, wherein in response to a validation result that indicates the set of parameter values is unacceptable, the processor is further configured to:
display an error message indicating that the set of parameter values is unacceptable;
receive a new set of parameter values entered via the set of input objects of the topology diagram displayed on the user interface;
validate that the new set of parameter values is acceptable;
configure the at least one configurable resource with the new set of parameter values; and
output a notification indicating that the requested set of resources configured with the new set of parameter values is capable of performing the task.

14. The system of claim 9, wherein the input object includes an image indicating at least two parameters.

15. The system of claim 9, wherein the processor is further configured to output an Internet Protocol (IP) address that leads to access of the requested set of resources.

16. The system of claim 9, wherein the processor is further configured to:
receive a request to reconfigure a particular resource;
receive a new parameter value entered via a particular input object of the topology diagram displayed on the user interface, wherein the particular input object corresponds to the particular resource;
validate that the new parameter value is acceptable; and
configure the particular resource with the new parameter value.

17. A computer program product of configuring a set of resources, the computer program product comprising a non-transitory computer readable storage medium having program instructions embodied therewith, the program instructions executable by a processing element of a device to cause the device to:
receive a request to perform a task;
identify a set of resources to perform the task, wherein the set of resources comprises at least one configurable resource;
identify at least one input object associated with the at least one configurable resource, wherein identifying the at least one input object includes referencing a resource database having mappings between a plurality of configurable resources and a plurality of input objects;
attach the at least one input object to the at least one configurable resource;
display a topology diagram on a user interface, wherein the topology diagram comprises:
a set of static image objects representing the identified set of resources;
the at least one input object attached to at least one static image object representing the at least one configurable resources, the at least one static image object being among the set of static image objects;
receive a set of parameter values entered via the at least one input object attached to the at least one static image of the topology diagram displayed on the user interface;
validate that the set of parameter values is acceptable, wherein the set of parameter values is acceptable when the set of parameter values are being used to configure the at least one configurable resource to cause the identified set of resources to perform the task successfully;
in response to the validation, autonomously configure the at least one configurable resource with the set of parameter values; and
output a notification, on the user interface displaying the topology diagram, indicating that the identified set of resources having the at least one configurable resource configured with the set of parameter values is capable of performing the task.

18. The computer program product of claim 17, wherein the at least one input object includes an image indicating at least two parameters.

19. The computer program product of claim 17, wherein in response to a validation result that indicates the set of parameter values is unacceptable, the program instructions are further executable by the processing element of the device to cause the device to:
- display an error message indicating that the set of parameter values is unacceptable;
- receive a new set of parameter values entered via the at least one input object of the topology diagram displayed on the user interface;
- validate that the new set of parameter values is acceptable;
- configure the at least one configurable resource with the new set of parameter values; and
- output a notification indicating that the identified set of resources having the at least one configurable resource configured with the new set of parameter values is capable of performing the task.

20. The computer program product of claim 17, wherein the program instructions are further executable by the processing element of the device to cause the device to:
- receive a request to reconfigure a particular resource;
- receive a new parameter value entered via a particular input object of the topology diagram displayed on the user interface, wherein the particular input object corresponds to the particular resource;
- validate that the new parameter value is acceptable; and
- configure the particular resource with the new parameter value.

* * * * *